ABSTRACT# United States Patent [19]

Dobson

[11] Patent Number: 4,559,882
[45] Date of Patent: Dec. 24, 1985

[54] BIOMASS-FUELED FURNACE

[76] Inventor: Lawrence A. Dobson, 1385 33rd Ave. S., Seattle, Wash. 98144

[21] Appl. No.: 616,902

[22] Filed: Jun. 4, 1984

[51] Int. Cl.[4] ............................................. F23G 3/00
[52] U.S. Cl. .................................. 110/254; 110/102; 110/116; 110/118; 110/208; 110/211; 110/214; 110/233; 110/299; 110/302
[58] Field of Search ............... 110/102, 116, 118, 208, 110/211, 229, 233, 234, 248, 254, 256, 257, 293, 298, 302, 309, 310, 300; 122/15; 165/DIG. 2

[56] References Cited

U.S. PATENT DOCUMENTS

| | | | |
|---|---|---|---|
| 4,102,279 | 7/1978 | Groschl et al. | 110/254 |
| 4,194,488 | 3/1980 | Bellaff | 165/DIG. 2 |
| 4,213,404 | 7/1980 | Spaulding | 110/254 |
| 4,242,972 | 1/1981 | Sicard | 110/234 |
| 4,254,715 | 3/1981 | LaHaye et al. | 110/248 |
| 4,325,310 | 4/1982 | Babbage | 110/116 |
| 4,341,199 | 7/1982 | Hand, Jr. et al. | 110/300 |
| 4,385,568 | 5/1983 | Murray | 110/234 |
| 4,438,756 | 3/1984 | Chamberlain et al. | 110/254 |
| 4,452,611 | 6/1984 | Richey | 110/229 |
| 4,461,243 | 7/1984 | Carpaneto | 122/15 |

Primary Examiner—Edward G. Favors
Assistant Examiner—Steven E. Warner

[57] ABSTRACT

A combustion system for domestic or small industrial heating needs, utilizing biomass fuels such as wood and brush chips, sawdust, logs, nut hulls, peat, leaves and other organic waste products of forestry, agriculture and industry with essentially smokeless, clean exhaust. By preheating the combustion air, insulating the combustion process and carefully controlling the fuel to air proportions and mixing parameters, essentially complete combustion with very little excess air at high temperatures is achieved even with fuels containing over half their weight in water. This water is then condensed out of the exhaust gases in uniquely designed air and water counterflow heat exchangers that can capture over 90% of the high heat value of the fuel. This invention is capable of maintaining clean combustion at high temperatures with little excess air, at burn rates much lower than the best popular "air-tight" woodstoves and is capable of higher heat outputs than most domestic heat plants. This biomass-fueled furnace does not require electric fans or controls and can be used where electricity is unavailable.

4 Claims, 8 Drawing Figures

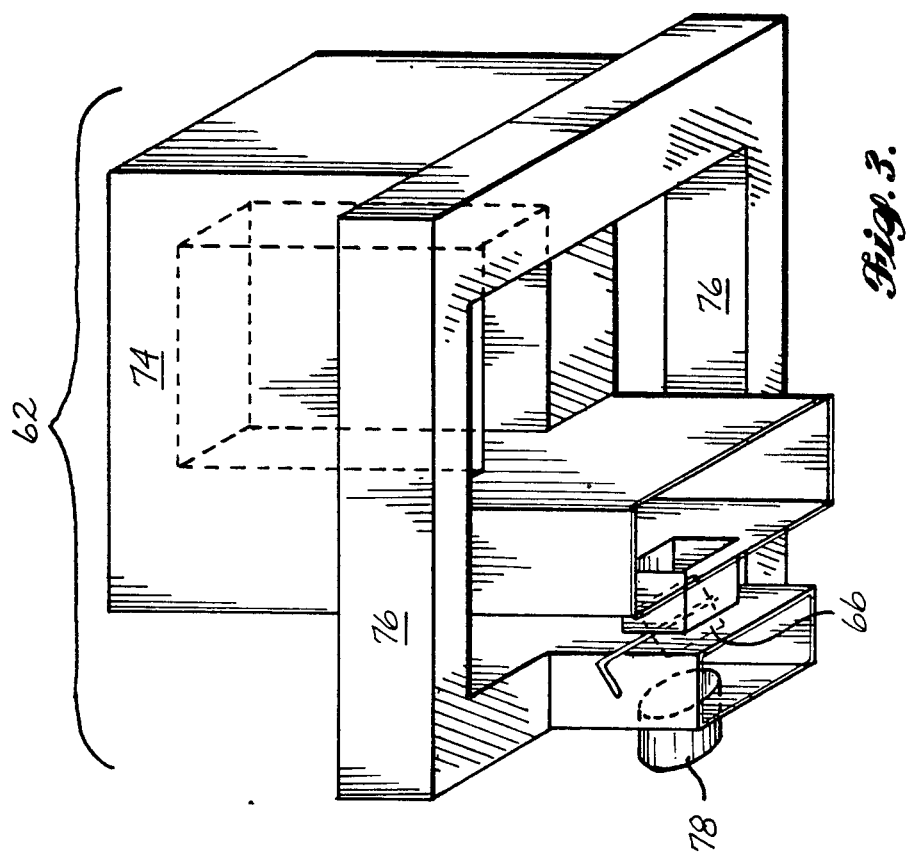
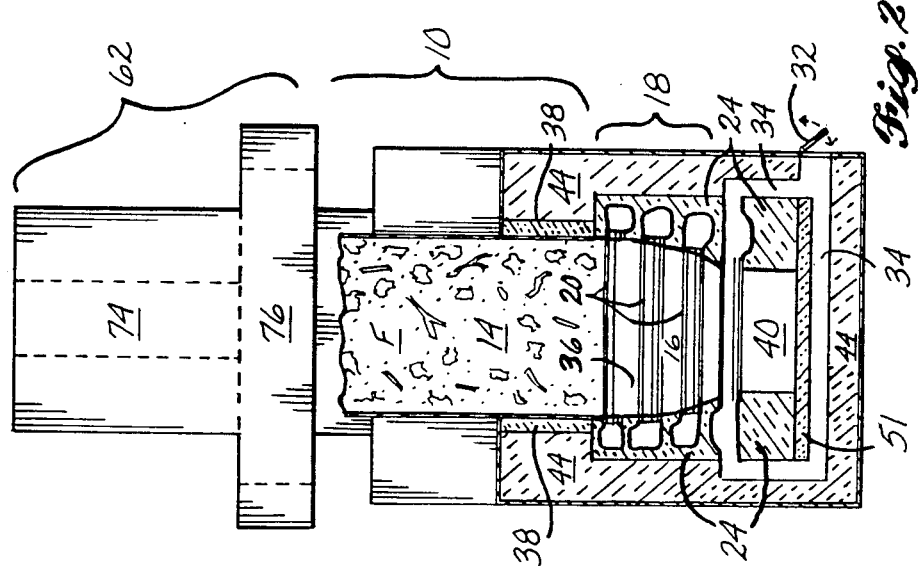

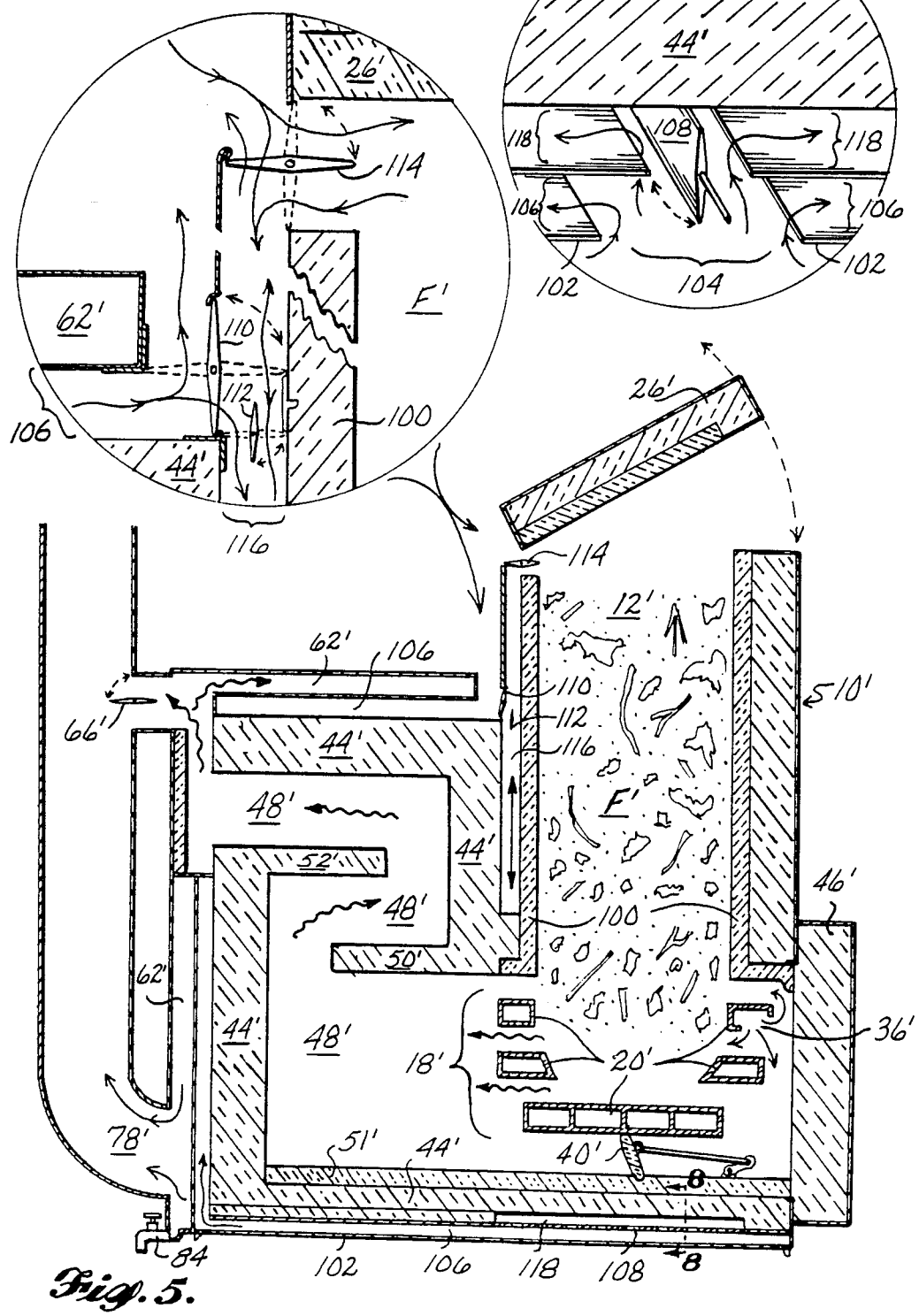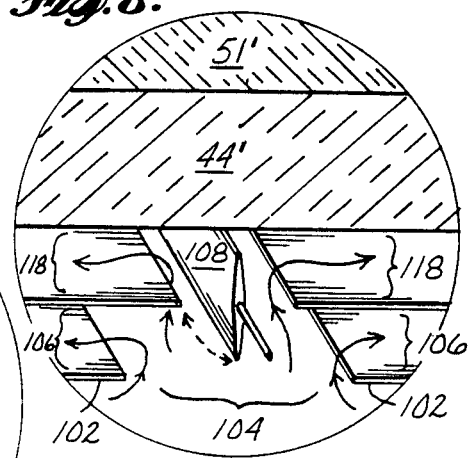

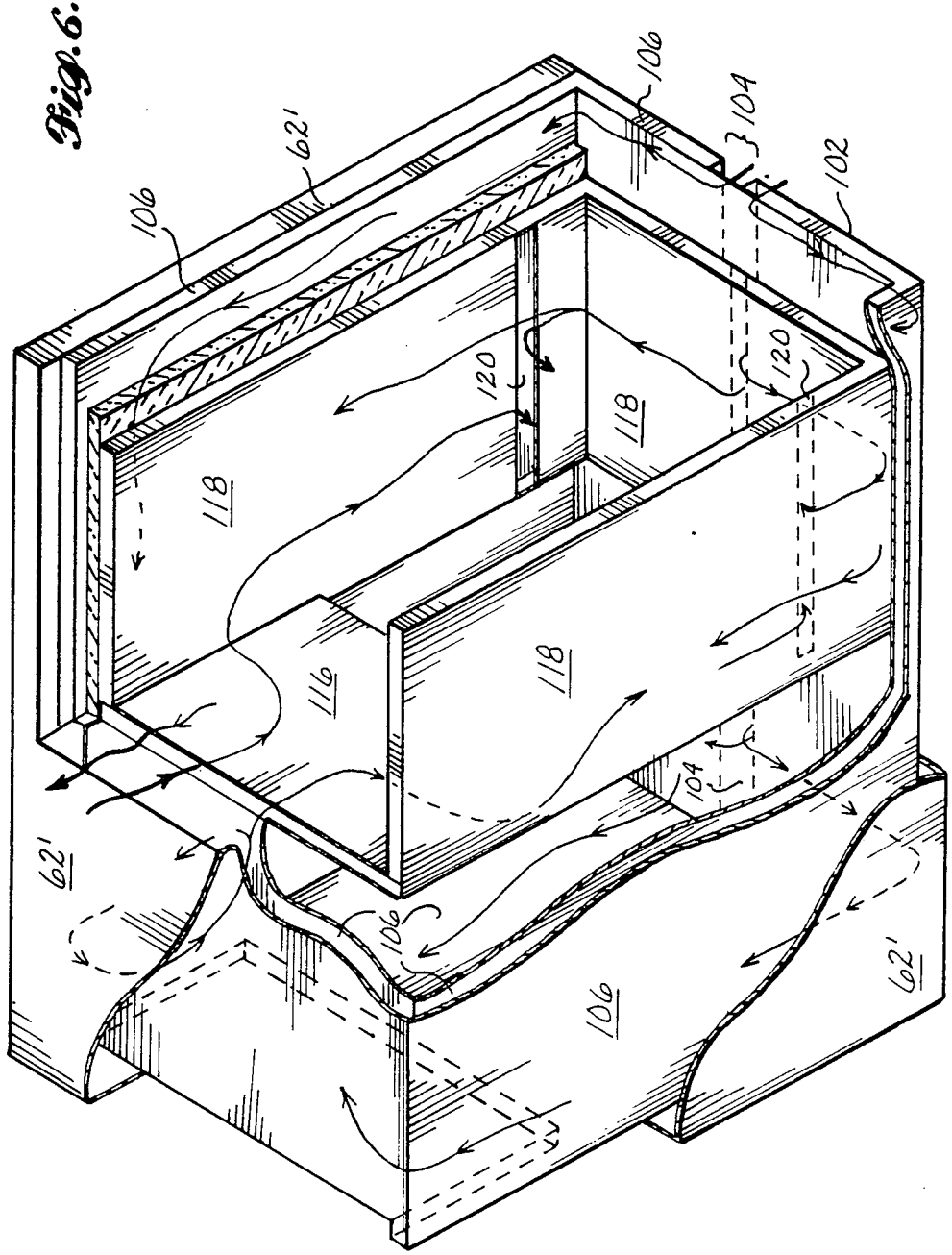

BIOMASS-FUELED FURNACE

BACKGROUND OF THE INVENTION

1. Field of the Invention

This invention relates to high-temperature combustion of dry, green or damp biomass fuels such as wood, brush and bark chips, sawdust, peat, nut hulls, straw or logs, and the efficient utilization of the evolved heat so that the moisture present in the fuel is condensed and 85 to 95% of the high heat content of the fuel is reclaimed.

2. Description of the Prior Art

Smoke pollution from wood stoves is reaching alarming proportions throughout the world, and conventional sawdust, chip, and hogged fuel-burners suffer from the same symptoms of inefficient combustion. Relatively dry fuels are generally required for cleaner burning, but biomass fuels with 40% or higher moisture content (% of damp weight) are much more available in the form of logging residue, brush and agricultural waste, at a lower cost than seasoned cordwood, and lend themselves better to automatic continuous fuel feed. Combustion problems with wood and other biomass fuels have been generally due to not enough heat for drying and ignition, uncontrolled cycles of drying and ignition, with either excess air or insufficient air, too much fuel burning at once or too little, and incomplete mixing of air and fuel. At the low burn rates generally required for domestic use exhaust emissions increase dramatically, because of incomplete combustion, which causes creosote and soot buildup on heat exchangers, and in turn fire hazards and even more inefficient heat transfer. Prior solutions have involved first making the fuel as dry as practical and then burning it as hot as possible, often with the consequence that more heat is generated than is needed and too much fuel is consumed. Another partial solution has been to use electric blowers to increase draft and the efficiency of the heat exchangers, with the consequence that the system is inoperative during power outages.

Numerous patents have been issued for improved wood stove designs and a few for sawdust and chip burning devices, but none is similar in design and operation to the biomass-fueled furnace described here. The closest prior art publications are two magazine articles about my earlier research efforts in developing this burner, namely "The Grendel Report" by Larry Dobson, *Alternative Sources of Energy*, June, 1980; and "An Amazingly Efficient Sawdust Stove", *The Mother Earth News Guide to Home Energy*, Autumn, 1980. However, these articles relate to a furnace quite different from the one described here, being a downdraft design with vertical baffles rather than a cross-draft-up-draft design with horizontal baffles as described here, combustion air being heated by the combustion chamber walls rather than through hollow grates in the ignition chamber or by the air heat exchanger as described here, insulation being with dirt, rather than high-temperature ceramic fiber insulation as described here, and air and water heat exchangers of conventional design, rather than the improved counterflow models described here.

SUMMARY OF THE INVENTION

Accordingly several objects of this invention are: (A) to preheat the combustion air hot enough to dry out the fuel and ignite it in a controlled ignition/pyrolysis zone; (B) to supply the optimum amount of air into a compartmentalized combustion zone with baffles for thorough mixing of the combustion gases; (C) to thoroughly insulate the ignition/pyrolysis and combustion zones to assure combustion temperatures above 1100° F., even at very low rates of fuel consumption; (D) to reclaim most of the heat from the gases, only after combustion is completed, through a combination of counterflow heat exchanger means based on the natural flow patterns of the cooling combustion gases and the air or water being heated, so that the moisture present in the fuel is condensed and collected as water, thus reclaiming the heat of vaporization and much of the water produced as a byproduct of the biomass combustion, thereby allowing wet fuels to be burned as efficiently as dry fuels; (E) to allow the whole process to take place with minimal friction, acceleration or deceleration of gases so that the natural draft of the exhaust gases up the flue, even at temperatures as low as 100° F., will be sufficient to operate the system at between 8,000 BTU/hr and 150,000 BTU/hr without the assistance of fans or electric controls.

Further objects and advantages of this invention will become apparent from a consideration of the drawings and ensuing description of typical embodiments thereof.

BRIEF DESCRIPTION OF THE DRAWINGS

FIG. 2 is a front view in cross section at midpoint of the fuel hopper, with the upper section of the hopper removed to more clearly show air heat exchanger.

FIG. 3 is an oblique projection from below of the air heat exchanger.

FIG. 5 is a longitudinal sectional view, with certain parts shown in side elevation and certain parts shown fragmentarily, showing a second preferred embodiment of the furnace.

FIG. 6 is an isometric projection of the concentric shells surrounding the furnace illustrated in FIG. 5, for heat-exchange between the hot exhaust gases and incoming air, and to channel the incoming air to the grate assembly, with the dampers, hopper, grate assembly, and interior features of the furnace being omitted for clarity.

FIG. 7 is an enlarged longitudinal sectional view of the dampers shown in FIG. 5.

FIG. 8 is an oblique front view in cross-section, taken substantially along line 8—8 of FIG. 5, showing in particular the relationship of the air-intake shells and associated damper.

DETAILED DESCRIPTION OF THE INVENTION

Figure 4:
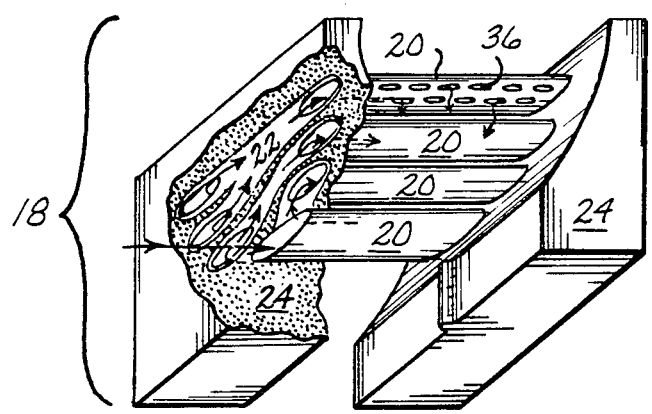
FIG. 4 is a perspective view from below of the grate assembly with the secondary air damper removed.

A preferred embodiment of this invention, as illustrated in FIGS. 1–4, consists of the following parts with their described functions The biomass fuel F is held in the hopper generally indicated at 10, having an upper section 12 and a lower section 14 through which the fuel F gravity feeds into an ignition/pyrolysis zone 16, where it is supported and contained by a grate assembly 18 (FIGS. 1, 2 and 4) comprising hollow rungs 20 and conduits 22 (FIG. 4) within side walls 24. A tight-fitting lid 26 is provided on the hopper 10 to prevent air from passing into the ignition/pyrolysis zone 16 through the hopper 10 when burning loose-packed fuels F.

A counterweighted hopper flap 28 automatically shuts when fuel falls below it, thus sealing off the hopper 10 when the lid is not used and signalling that it is time to recharge the hopper 10 with fuel. An electric switch (not shown), such as a mercury switch, can be attached to the arm 30 of the counterweighted hopper flap 28 to activate an automatic fuel feeding mechanism such as an auger or conveyor belt (not shown), or to turn on a hopper agitator (also not shown) to free fuel hang-ups in the upper section 12 of the hopper 10, if desired. In the latter case the switch can automatically turn off the agitator when the flap 28 is pushed open by the entering fuel F. The hopper flap 28 has been found to be highly reliable.

Figure 1:
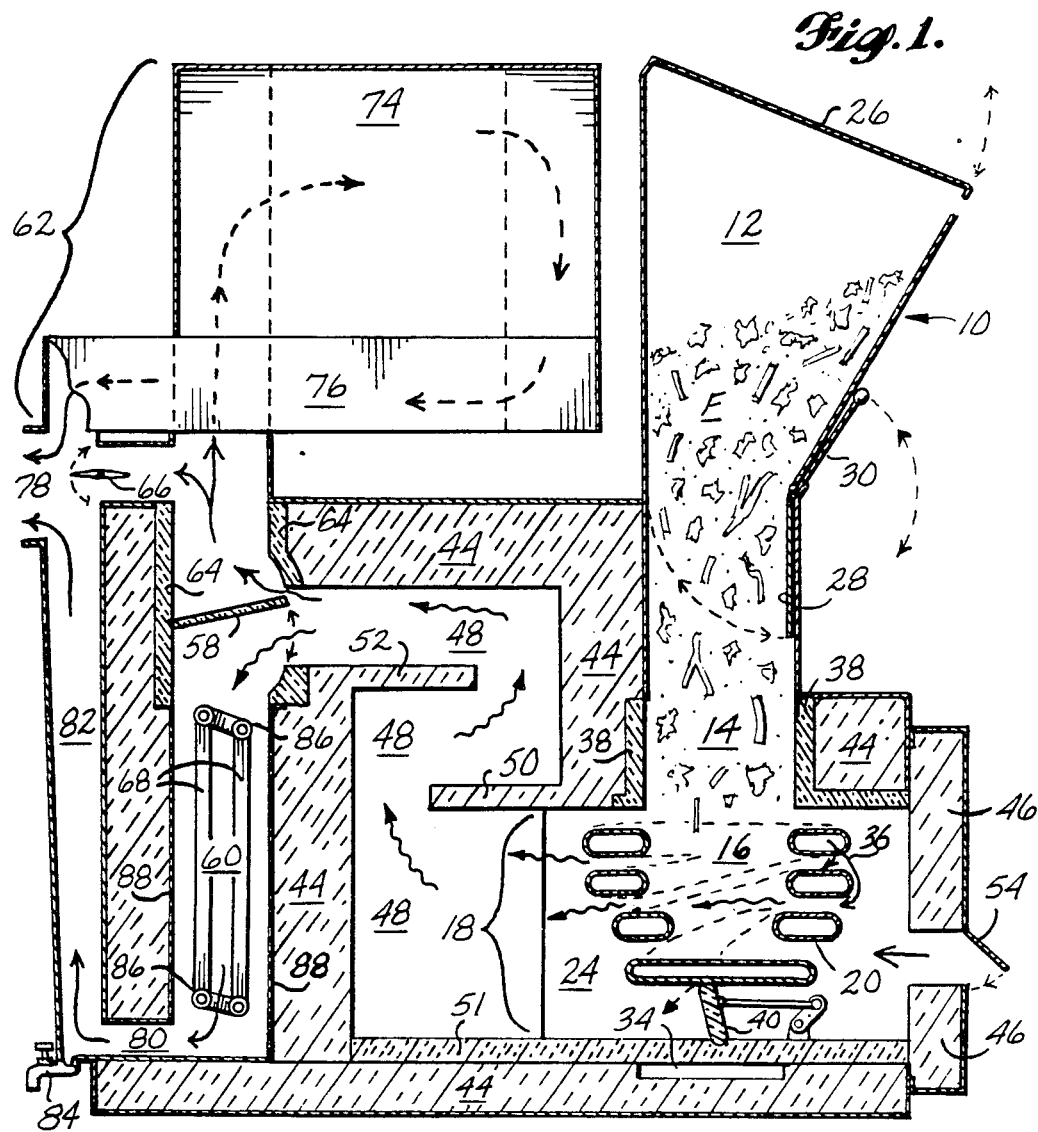
FIG. 1 is a longitudinal sectional view, with certain parts shown in side elevation, showing a furnace with fuel hopper, air heat exchanger, water heat exchanger, and interconnecting damper and conduit arrangement.

In the illustrated first embodiment, FIGS. 1 and 2, the hopper 10 in its lower section 14 is suitably eight inches deep and twelve inches wide. FIG. 1 shows the eight inch depth. FIG. 2 shows the twelve inch width. All other dimensions of parts show in the drawings are in relative proportions. These measurements of this first preferred embodiment are for heat requirements of about 8,000 BTU/hr to 150,000 BTU/hr from fuel of such density as hogged fuel, green sawdust or chips smaller than three inches. For looser packed fuels such as chopped branches, corn cobs or logs, the depth of the hopper can be increased to twelve inches by twelve inches, for example, as illustrated in the second preferred embodiment, FIG. 5. For different fuels or heat requirements the relative proportions of the various parts of the system may vary.

In the first illustrated embodiment, FIGS. 1, 2 and 4, combustion air ingresses past adjustable damper 32 (FIG. 2), thence through channel 34 to the grate assembly 18, into the lower hollow grate rung 20 and into hollow conduits 22 in the side walls 24 of the grate assembly 18, the air circulating serially through all of the grate rungs 20 in a double spiral path, as illustrated in FIG. 4, and exiting through discharge orifices 36 in the top front rung 20 of the grate assembly 18, typically at temperatures of 1000° F. to 1500° F. As the combustion air is progressively preheated, the grate rungs 20 are cooled to minimize slag buildup from ash and prevent rapid deterioration of the grate rungs from excessive heat. Experience has shown that other circulation patterns, such as the air entering one side of the bottom grate rung and traveling in a single spiral path through all the rungs, also work efficiently, the important consideration being that the incoming air is preheated within, and in turn cools, the grate.

The hollow grate rungs 20, the surrounding side walls 24 (FIG. 2) that contain the hollow conduits or channels 22 connecting the grate rungs 20, the base 38 of hopper lower section 14 and the secondary air damper 40, all illustrated in FIGS. 1, 2 and 5, must be made of a material able to withstand operating temperatures up to 2000° F. or higher, such as ceramic refractory, silicon carbide, or high-chromium stainless steel. The radiant heat transfer within the grate rungs can be increased by internal cooling fins or a corrugated stainless steel gridwork, if desired.

The combustion chamber is surrounded by the innermost insulation shell 44 of the furnace and the insulated access door 46. Said combustion chamber is comprised of the solid-fuel ignition/pyrolysis zone 16 and the secondary combustion zone 48 wherein the flammable gases produced by the pyrolysis reaction are burned.

After entering the ignition/pyrolysis zone 16 through the air discharge orifices 36 the preheated combustion air passes through the body of the fuel F supported by the grate rungs 20, thereby drying and igniting the lowermost portion of the fuel charge and producing by pyrolysis a combustible gas, e.g., wood gas, which burns in the secondary combustion zone 48, which area is partitioned into three subchambers by horizontal baffles 50, 52, said baffles insuring thorough mixing of the combustible gases and the combustion air, and increasing the time the gases remain in the insulated secondary zone 48. If the fuel/air mixture is too rich, preheated secondary combustion air is introduced past secondary air inlet damper 40. When cool air directly from outside the burner is preferred, as when starting the fire or when burning very dry fuels, air inlet damper 54 (FIG. 1) in the access door 46 may be used.

The baffles 50, 52 separate the secondary combustion zone 48 into three compartments which effectively mix the combustion air with the combustible gases so that virtually smokeless combustion is achieved with as little as 30% excess air at temperatures between 1200° F. and 2300° F. The high temperatures are achieved by careful insulation of the inner shell 44 of the secondary combustion zone 48 with at least four inches of high temperature refractory fiber insulation board and blanket, such as kaolin fiber insulation, or equivalent insulation. Only the inside floor 51 of the combustion zone 48 need be of a hard refractory material, such as mullite, to resist abrasion during ash cleanout, although the rest of the inner shell 44 may be lined with a denser refractory material, if desired.

After the gases are thoroughly combusted they are directed by a damper 58 to the water heat exchanger 60 or air heat exchanger 62, or a combination of the two. The damper 58 and surrounding damper housing 64 must be made of a material capable of withstanding temperatures up to 2300° F., preferably silicon carbide for the damper 58 and a cast refractory ceramic, e.g. high alumina, for the housing 64. The damper 58 must make a tight seal when closed to either the upper heat exchanger 62 or the lower heat exchanger 60.

Bypass damper 66, shown in FIGS. 1 and 3, is opened to establish a strong draft during start-up, and closed during normal operation. Initial start-up is accomplished very cleanly and easily, even with damp fuels, by mixing waste paper and dry fuel with the first bucketful of fuel loaded into the hopper.

Both the air heat exchanger 62 and the water heat exchanger 60 are designed so that, as the hot combusted gases cool, contract and become relatively heavier, they are allowed to fall or move downwardly through the heat exchanger means. Cool water courses the water ducts 68 from the lower region thereof to its upper region so that the gases give up their heat to the cooler water rising in counterflow relation in the water heat exchanger 60. Similarly, the hot gases coursing the air heat exchanger 62 flow from upper region 74 to lower region 76 where they exit into the flue 78. As will be apparent from inspection of FIGS. 1 and 3, as the hot gases give up their heat to the cooler room air rising past the air heat exchanger 62, they contract and fall into the air heat exchanger lower region 76, and as these gases give off more of their heat to the cooler outside air the coolest gases pass into the exhaust flue 78.

Such orderly stratification of the cooling gases in one or both of the heat exchangers 60, 62 promotes more efficient heat transfer than where turbulent mixing is employed, as with most blower systems. In this system, as a result, the combusted gases can cool from 1800° F. to 150° F., for example, in a short distance, thereby condensing considerably quantities of water in the cooler parts of the heat exchangers. Water precipitating in the lower region 76 of the air heat exchanger 62 drains down into water collection pan 80 below the water heat exchanger 60, via external flue gas duct 82, and water condensing on the water heat exchanger 60 also collects in pan 80. The usually clear or slightly yellow water is then drained from the system at drain valve 84. The condensing water not only reclaims heat used to evaporate the moisture in the fuel, it extracts heat from the considerable moisture created in the flue gases as a product of hydrocarbon combustion. The condensation also aids the draft by reducing the volume of the flue gases, and it cleans the exhaust of fine particulate matter that would otherwise be expelled out the exhaust flue 78.

As will be apparent the surfaces of water heat exchanger 60 exposed to condensing water and combusted gases are to be constructed of adequately temperature resistant and rust resistant material. Thus, the water heat exchanger 60 is suitably constructed of a series of vertical copper or stainless steel pipes 68, connected to larger plenum pipes 86, of similar material (as shown in FIG. 1 in cross section). The water heater shell 88, the condensation collection pan 80, and the external flue gas duct 82 must make a tight seal with each other and be constructed of a material that will withstand the corrosive action of the condensing moisture, such as stainless steel. Similarly, in the air heat exchanger 62, the surfaces exposed to the high temperature combusted gases and condensing moisture are to be of appropriate construction, the hottest sections suitably being fabricated of stainless steel, cast iron, ceramic, graphite or stone, and the coolest sections of stainless steel, enameled steel, aluminum alloy or other material suitable for such corrosive conditions, with use of stainless steel throughout being preferred in this embodiment.

FIGS. 5-8 show another preferred embodiment of the invention, specifically designed for burning logs, brush chips, other loose-packed fuels, and extremely wet fuels, at very low burn rates while maintaining high combustion temperatures and minimal excess air. This capability is highly advantageous for automatic continuous-feed operation, allowing the furnace to "idle" with very little fuel consumption yet able to give immediate heat on demand. The preceding description of operating principles and nomenclature applies as well to this second embodiment, with primed numerals referring to like parts and with additional features as discussed below.

The hopper 10' is enlarged to 12"×12" cross section to accommodate more fuel in a non-constricting configuration. The walls 100 of the hopper 10' are made of dense refractory material and the entire hopper 10' including tight-sealing lid 26' is insulated to prevent heat loss, excess convection flow of smoke through the porous fuel charge F', and buildup of sticky creosote deposits on the walls 100 of the hopper 10'. No hopper flap is provided in this embodiment.

To provide maximum preheating of incoming combustion air for extremely wet fuels and to turn the furnace down to very low burn rates, heat is extracted from the air heat exchanger 62' by means of a concentric shell arrangement of air and exhaust gas channels. Hot exhaust gases travel from the secondary combustion zone 48' through heat exchanger shell 62' which surrounds the top, sides and back of the combustion zone and grate assembly 18' exiting into flue 78' from the bottom of the back (FIG. 5). Bypass damper 66' is opened for cold start-up.

The inside shell of the heat exchanger 62' and the outside of the furnace insulation shell 44', along with bottom wall 102 and non-closable air intake opening 104 in bottom wall 102 (FIGS. 5, 6 and 8), define an air duct generally indicated at 106, for heating either incoming combustion air or heating ambient air. In effect this air duct 106 doubles the surface area of the heat exchanger 62' when used for heating ambient or outside air.

When maximum preheating of combustion air is required, dampers 108 and 110 are closed and damper 112 is open. Note FIGS. 5, 7 and 8 for greater detail as to these dampers. Dampers 108, 110, 112 and 114 are of similar stainless steel design and pictured in open position in FIGS. 7 and 8. Air is thereby channeled through duct 106 down through interior ducts 116 and 118 and through openings 120 into grate assembly 18'.

When less preheating of combustion air is required, damper 110 is opened, thereby allowing air heated in duct 106 to escape to heat the ambient. Cool room air is then brought into duct 116, past open damper 112.

When minimal preheating of combustion air is required, as for very dry fuels or high burn rates, dampers 108, 110 and 112 are opened, thereby allowing cool air to enter through bottom opening 104 into the innermost duct 118, and from there into the grate assembly 18' through opening 120. Air heated in ducts 106, 118 and 116 is allowed to flow up past damper 112 and 110, out into the surrounding ambient, e.g. room or furnace ducting.

With loose-packed fuels such as logs and chipped brush, the upper hopper area 12' tends to become filled with smoke, which can enter the room when opening the lid 26' for recharging with fuel F'. To prevent this from happening, damper 114 is opened with damper 112 and 110 open and 108 closed. This arrangement allows fresh air to be drawn in past the underside of lid 26' to displace the smoke in the upper part of 12' of hopper 10', said smoke being drawn down channel 116 as combustion air. In a short time the lid 26' may be opened without passing smoke into the room.

For burning garbage and municipal waste, the furnace can be enlarged considerably in size. The grate rungs can be of round cross section rather than being oval or flat on top, in order to minimize collection of non-combustible debris. The number of grate rungs can be increased and extended further below the bottom of the hopper in order to enlarge the ignition pyrolysis zone. The spacing between the front and rear grate rungs can be constant with each descending pair of grate rungs instead of being closer together in the manner shown in FIG. 1. These modifications aid in preventing hang-ups with fuel containing much non-burnable debris, such as garbage, or fuels having a rigid ash buildup, such as rice husks. Removal of ash and debris at the bottom of the grate area can be facilitated by a moving conveyor or periodically activated plunger.

Another embodiment of this invention for use as a gasifier involves increase in the size and number of grate rungs and the volume of the ignition pyrolysis zone 16' within the grate assembly 18' and the use as combustion air of all the air heated by the air heat exchanger 62' (as in FIGS. 5 and 6), which is then drawn through the channels 116 and 118 into the hollow grate assembly 18' and there further heated for combustion. In this embodiment, the air heat exchanger 62' would be surrounded by a well-insulated shell, with a hollow channel between said shell and the heat exchanger connecting with channel 116. In this configuration the preheated combustion air is considerably increased in temperature and the furnace is operated on an oxygen deficient basis, to produce an extremely oxygen deficient producer gas, which is further broken down into mainly carbon monoxide and hydrogen in a reaction chamber, which is suitably similar in design to the configuration of secondary combustion zone of the furnace shown in FIG. 5. The hot producer gas then gives up much of its heat in the heat exchanger 62' to the incoming combustion air. The producer gas may be passed through a filter/condenser system known per se and is then fed to an internal combustion engine, gas turbine or other producer gas utilizing device.

Another embodiment of this invention for use as a kiln, for firing pottery or other such wares, involves enlarging the secondary combustion zone 48' and the horizontal baffles 50' and 52', which in this instance are constructed of a suitable hard refractory material to serve as kiln shelves, accessible through an access door provided in the side or back. The combustion chamber insulation can be increased to retain more heat and the combustion air preheated by the exhaust gases through a system of concentric shells similar to that described for the gasifier embodiment. A bypass damper can be provided in the lower portion of the secondary combustion zone to allow the fire to burn without circulating the hot gases directly through the upper kiln, thereby controlling the kiln temperature independent of the flame temperature and preventing thermal shock to the kiln charge.

Yet another embodiment of this invention to use for melting metals such as aluminum or bronze involves designing the combustion chamber with an opening in the top to accept a crucible, the crucible providing a tight seal with the furnace shell and protruding into the combustion chamber above horizontal baffle 52', which space would be enlarged to accommodate said crucible and allow for passage of the hot gases around and past the crucible.

To use this embodiment as a furnace for melting glass for glass blowing, the space above the crucible can is enclosed by an insulated chamber fitted with an access door through which a blowpipe can be inserted.

Insofar as the preheated incoming combustion air delivery orifices in or associated with the grate assembly, these orifices may be arranged, alternatively or conjunctively, in the side walls of the grate assembly or can be arranged in the rear top rung of the grate for delivery of preheated air as secondary combustion air. Also the side walls rearwardly of the furnace can be utilized for orifices for delivery of secondary combustion air.

Other modules can be incorporated into the furnace to utilize the clean heat as a cookstove, or to run an external combustion engine such as a Sterling engine and utilize the exhaust heat from the engine in the other heat-exchangers as a co-generation system, or to generate electricity through a thermopile or other solid state device, known per se.

As will be understood, the various damper means above discussed function as flow control means, and various other constructions and techniques are available to perform the function thereof, such as fluidic valves involving selectively controlled air flow deflecting air jets known per se.

Other variations, adaptations, and modifications in construction will occur to those skilled in the art to which the invention is addressed, within the scope of the following claims.

What is claimed is:
1. A biomass-fueled furnace for burning dry, green, or wet biomass fuels, such as logs, wood and brush chips, sawdust, nut shells, peat, and biomass waste products of agriculture and industry, at high temperatures and high combustion efficiency, comprising:
   a gravity feed hopper into which the fuel is charged;
   a grate system below said hopper upon and between which the fuel rests, said grate system comprising several hollow grate rungs and interconnecting channels through which combustion air travels, thereby preheating said air to aid drying and igniting of said fuel and cooling said grate system to retard the formation of ash slag and the deteriorating of said grate system;
   a fully insulated ignition/pyrolysis zone into which the preheated air enters through holes in said grate system and passes in a generally horizontal path through said fuel resting on said grate rungs, thereby drying and igniting said fuel and liberating combustible gases;
   a ceramically insulated secondary combustion chamber, laterally connected to the ignition/pyrolysis zone and capable of withstanding operating temperatures of at least 1500° F., the secondary combustion chamber insulation enabling secondary combustion of the evolved gases at temperatures above 1200° F., said secondary combustion chamber being partitioned by at least two substantially horizontally disposed baffles which effectively mix the preheated air with said combustible gases while allowing them to alternately travel horizontally and upwardly as they mix and burn; and
   a secondary combustion chamber air inlet including damper means for controlled delivery of additional preheated combustion air directly into the secondary combustion chamber without passing through the fuel charge.

2. A biomass-fueled furnace as set forth in claim 1, further comprising a counterflow heat exchanger to which the hot combusted gases are directed from the secondary combustion chamber in a downward flow path so that gravity aids the draft and aids the separation of cooled gases from the hot gases, and so that natural convection assists the counterflow of the fluid being heated by the hot combusted gases flowing through the heat exchanger.

3. A biomass-fueled furnace according to claim 2, wherein the convection assisted counterflow heat exchanger has sufficient surface area to allow the flue gases to cool to below 212° F., whereby the moisture originally present in the fuel is condensed, thereby yielding back the heat initially required to vaporize it and assisting the draft by reducing the volume of the flue gases.

4. A biomass-fueled furnace in accordance with claim 2, wherein the convection assisted counterflow heat exchanger is formed as a hollow shell surrounding said secondary combustion chamber, with an air duct between it and said combustion chamber, through which duct incoming air travels and is heated, said air duct being connected by adjustable damper means either to a duct leading to the air intake port of the grate assembly, or to a duct leading outside the furnace and heat exchanger, thereby either increasing the temperature of the preheated combustion air or increasing the efficiency of the heat exchanger.

* * * * *